US012558921B2

(12) United States Patent
Nakajima et al.

(10) Patent No.: US 12,558,921 B2
(45) Date of Patent: Feb. 24, 2026

(54) TIRE

(71) Applicant: Sumitomo Rubber Industries, Ltd., Kobe (JP)

(72) Inventors: Tokuhito Nakajima, Kobe (JP); Isao Sawakami, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 19/082,538

(22) Filed: Mar. 18, 2025

(65) Prior Publication Data

US 2025/0319724 A1 Oct. 16, 2025

(30) Foreign Application Priority Data

Apr. 10, 2024 (JP) ................................. 2024-063230

(51) Int. Cl.
*B60C 9/02* (2006.01)
*B60C 9/04* (2006.01)
*B60C 9/22* (2006.01)

(52) U.S. Cl.
CPC .................. *B60C 9/22* (2013.01); *B60C 9/04* (2013.01); *B60C 2009/0284* (2013.01); *B60C 2009/0425* (2013.01)

(58) Field of Classification Search
CPC . B60C 15/0036; B60C 15/0009; B60C 15/00; B60C 13/00; B60C 2013/007; B60C 11/00; B60C 2011/0016; B60C 2011/0033; B60C 9/02; B60C 9/04; B60C 2009/0284; B60C 2009/0425
See application file for complete search history.

(56) References Cited

U.S. PATENT DOCUMENTS

| 2016/0368328 A1 | 12/2016 | Sakurai |
| 2019/0202245 A1* | 7/2019 | Sanae ................. B60C 15/0242 |
| 2020/0016941 A1 | 1/2020 | Higuchi et al. |
| 2023/0001751 A1* | 1/2023 | Kuwayama ............. B60B 21/12 |

FOREIGN PATENT DOCUMENTS

| CN | 117730006 A | 3/2024 |
| EP | 3189988 A1 | 7/2017 |
| JP | H09-286211 A | 11/1997 |
| WO | WO-2023198362 A1 * | 10/2023 ......... B60C 15/0009 |

OTHER PUBLICATIONS

Extended European search report issued on Sep. 19, 2025, in corresponding European patent Application No. 25163262.6, 9 pages.

* cited by examiner

*Primary Examiner* — Cedrick S Williams
(74) *Attorney, Agent, or Firm* — XSENSUS LLP

(57) ABSTRACT

A tire can include beads, a carcass, sidewall layers, a tread, a belt, and a band. A carcass ply of the carcass can include a ply body and a pair of turned-up portions. An end of each turned-up portion can be located axially inward of an end of the belt. A ratio of a thickness from the carcass to an outer surface of the tire along a first normal line to a thickness from the carcass to the outer surface of the tire along a second normal line can be not less than 1 and not greater than 2.

14 Claims, 6 Drawing Sheets

TIRE

CROSS-REFERENCE TO RELATED APPLICATION(S)

The present application claims priority to Japanese patent application JP 2024-063230, filed on Apr. 10, 2024, the entire content of which is incorporated herein by reference in its entirety.

BACKGROUND

Field

The present disclosure relates to a tire. Specifically, the present disclosure relates to a tire that is mounted and/or mountable to a passenger car.

Background Art

The mass of a tire can influence rolling resistance. In consideration of influence on the environment, tires having reduced rolling resistance may be desired or required.

In order to reduce the mass of a tire, if the number of carcass plies constituting a carcass is reduced, the lengths of turned-up portions of the carcass plies may be shortened, etc., the stiffness of the tire may be decreased.

A load can act on a tire. During running, deformation and restoration are repeated in the tire. The stiffness of the tire can influence durability. If the tire is reinforced by incorporation of a new element, etc., in order to improve durability, the mass of the tire is increased.

Therefore, various studies have been conducted in order to establish a technology capable of improving durability while achieving mass reduction of the tire (e.g., Japanese Laid-Open Patent Publication No. H09-286211).

SUMMARY

According to one or more aspects a tire having a load index LI satisfying a relationship indicated by the following formula (1) or formula (2), can comprise: a pair of beads; a carcass extending on and between the pair of beads; a pair of sidewall layers located axially outward of the carcass; a tread located radially outward of the carcass and configured to come into contact with a road surface; a belt including a large number of belt cords aligned with each other; and a band including a helically wound band cord. The belt can be stacked on the carcass on a radially inner side of the tread. The band can be located between the tread and the belt in a radial direction. The carcass can be composed of one carcass ply including a large number of carcass cords aligned with each other. The carcass ply can include a ply body and a pair of turned-up portions. The ply body can extend between the pair of beads. The respective turned-up portions can be connected to the ply body and turned up from an inner side toward an outer side in an axial direction at the respective beads. An end of each turned-up portion can be located axially inward of an end of the belt. A normal line of the carcass that passes through a point of intersection of an outer surface of the tire and a first virtual line that passes through the end of the belt and extends in the axial direction can be regarded as a first normal line. A normal line of the carcass that passes through a maximum width position of the tire can be regarded as a second normal line. A ratio D/E of a thickness D from the carcass to the outer surface of the tire along the first normal line to a thickness E from the carcass to the outer surface of the tire along the second normal line may be not less than 1 and not greater than 2.

$$LI_x \le LI \le LI_x + 4 \qquad \text{Formula (1)}$$

$$LI = LIh \qquad \text{Formula (2)}$$

$LI_x$ in formula (1) and $LIh$ in formula (2) are as follows:

$LI_x$: load index of an EXTRA LOAD CAPACITY type tire specified in the ETRTO STANDARD MANUAL 2019, having the same dimensional structural characteristics as dimensional structural characteristics included in the tire designation of the tire, and $LIh$: load index of a HIGH LOAD CAPACITY type tire specified in the ETRTO STANDARD MANUAL 2021, having the same dimensional structural characteristics as the dimensional structural characteristics included in the tire designation of the tire.

DETAILED DESCRIPTION

Figure 1:
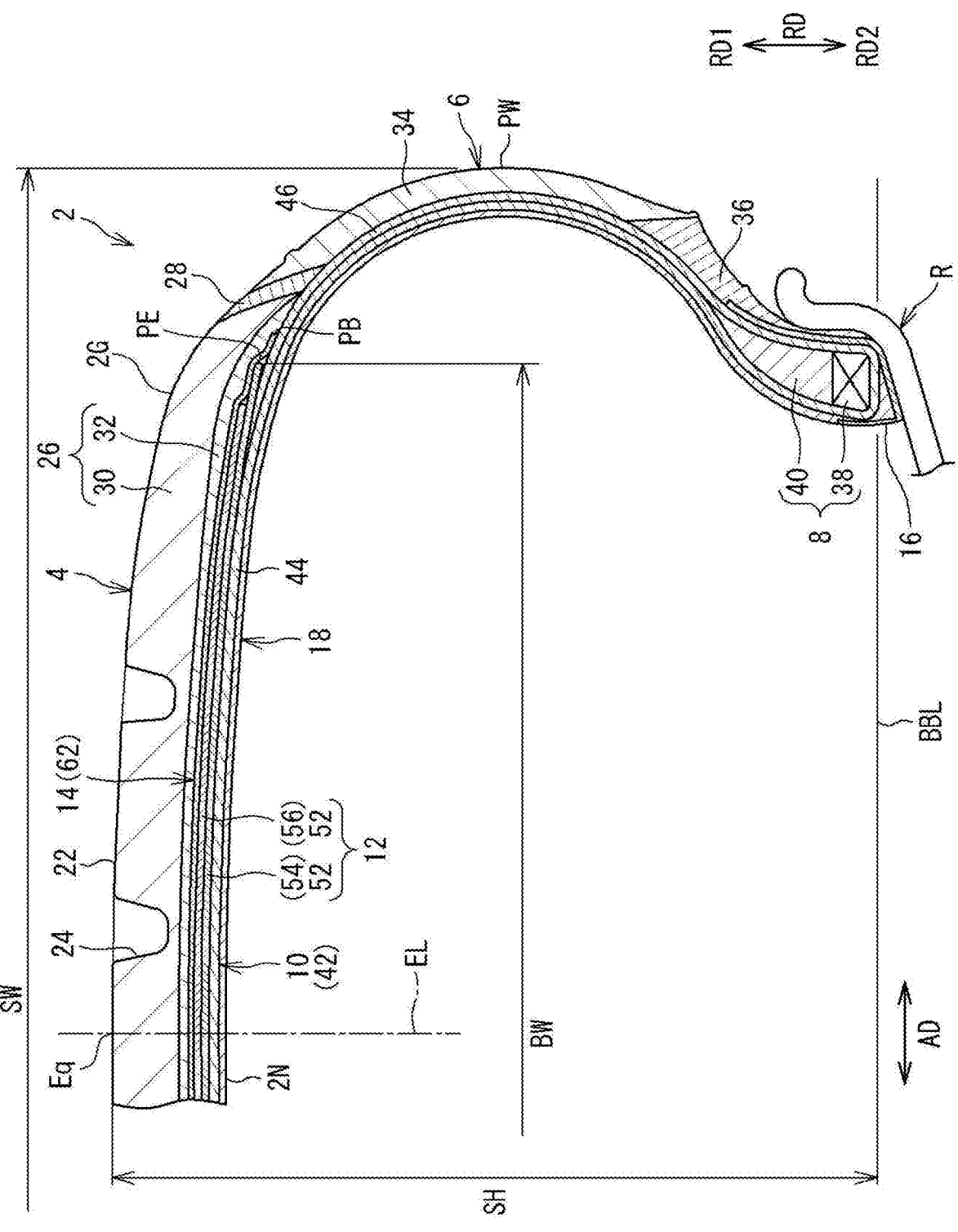
FIG. 1 is a cross-sectional view showing a part of a tire according to one or more embodiments of the present disclosure.

Hereinafter, aspects will be described in detail based on one or more preferred embodiments with appropriate reference to the drawings.

An object of one or more embodiments of the present disclosure, among one or more objects, can be to provide a tire that can achieve improvement of durability without an increase in rolling resistance.

According to one or more embodiments of the present disclosure, a tire that can achieve improvement of durability without an increase in rolling resistance, can be obtained.

A tire according to one or more embodiments of the present disclosure can be fitted on a rim. The interior of the tire can be filled with air to adjust the internal pressure of the tire. The tire fitted on the rim may also be referred to as tire-rim assembly. The tire-rim assembly can include the rim and the tire fitted on the rim.

In the present disclosure, a state where a tire is fitted on a standardized rim, the internal pressure of the tire is adjusted to a standardized internal pressure, and no load is applied to the tire can be referred to or regarded as standardized state.

A state where the tire is fitted on the standardized rim, the internal pressure of the tire is adjusted to 290 kPa, and no load is applied to the tire can be referred to or regarded as reference state.

In the present disclosure, unless otherwise specified, the dimensions and angles of each component of the tire can be regarded as being or having been measured in the standardized state.

The dimensions and angles of each component in a meridian cross-section of the tire which cannot be measured in a state where the tire is fitted on the standardized rim are measured in a cut plane of the tire obtained by cutting the tire along a plane including a rotation axis. In this measurement, the tire can be set such that the distance between right and left beads is equal to the distance between the beads in the tire that is fitted on the standardized rim. The configuration of the tire that cannot be confirmed in a state where the tire is fitted on the standardized rim can be confirmed in the above-described cut plane.

The standardized rim can mean a rim specified in a standard on which the tire is based. The "standard rim" in the JATMA standard, the "Design Rim" in the TRA standard, and the "Measuring Rim" in the ETRTO standard can be regarded as examples of standardized rims.

The standardized internal pressure can mean an internal pressure specified in the standard on which the tire is based. The "highest air pressure" in the JATMA standard, the "maximum value" recited in the "TIRE LOAD LIMITS AT VARIOUS COLD INFLATION PRESSURES" in the TRA standard, and the "INFLATION PRESSURE" in the ETRTO standard can be regarded as examples of standardized internal pressures.

A standardized load can mean a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard can be regarded as examples of standardized loads.

In the present disclosure, unless otherwise specified, a load index (LI) can be regarded as an index that is specified in the JATMA standard and that represents a maximum mass allowed to be applied to the tire under specified conditions, that is, a maximum load capacity, as an index number.

In the present disclosure, the "dimensional structural characteristics included in the tire designation" can mean the dimensional structural characteristics represented by the "nominal cross-sectional width," the "nominal aspect ratio," the "tire structure symbol," and the "nominal rim diameter" included in the "tire designation" specified in JIS D4202 "Automobile tyres-Designation and dimensions," as examples. The dimensional structural characteristics may also be referred to as tire size.

In the present disclosure, the "nominal cross-sectional width" and the "nominal aspect ratio" can mean the "nominal cross-sectional width" and the "nominal aspect ratio" included in the dimensional structural characteristics.

For example, if the "tire designation" is "195/65R16 106/104 L LT," "195/65R16" included in this "tire designation" is the dimensional structural characteristics, "195" is the nominal cross-sectional width, and "65" is the nominal aspect ratio.

In the present disclosure, a tread portion of the tire can be a portion of the tire that comes into contact with a road surface. A bead portion can be a portion of the tire that is fitted to a rim. A sidewall portion can be a portion of the tire that extends between the tread portion and the bead portion. The tire can include a tread portion, a pair of bead portions, and a pair of sidewall portions as portions thereof.

A boundary portion between the tread portion and each sidewall portion may also be referred to as buttress.

Findings

Electric vehicles are becoming increasingly widespread due to environmental considerations. Electric vehicles are equipped with batteries. Batteries enabling travelling for a distance of around 500 km are heavy. Electric vehicles tend to be heavier than conventional gasoline-powered vehicles. Thus, higher loads act on tires mounted on electric vehicles, than on tires mounted on gasoline-powered vehicles.

In order to provide tires that can support higher loads, the load index has been reviewed in the ETRTO standards, and a HIGH LOAD CAPACITY type (hereinafter referred to as HLC type) tire has been introduced as a new category.

To qualify a tire as an HLC type tire, the tire is required to be able to support a higher load than conventional tires.

To achieve this, the stiffness of the tire can be increased. However, if the stiffness of the tire is increased, there may be a concern that the mass of the tire is increased as described above.

Since an increase in the mass of a tire can lead to an increase in rolling resistance, the present inventors have found that by reviewing the structure of a carcass and the thickness of each tire portion, it is possible to impart the stiffness required for the tire even if the carcass is composed on one carcass ply instead of two carcass plies.

Outline

One or more aspects of the present disclosure are directed to or include a tire having a load index LI satisfying a relationship indicated by the following formula (1) or formula (2), the tire including: a pair of beads; a carcass extending on and between the pair of beads; a pair of sidewall layers located axially outward of the carcass; a tread located radially outward of the carcass and configured to come into contact with a road surface; a belt including a large number of belt cords aligned with each other; and a band including a helically wound band cord, wherein the belt is stacked on the carcass on a radially inner side of the tread, the band is located between the tread and the belt in a radial direction, the carcass is composed of one carcass ply including a large number of carcass cords aligned with each other, the carcass ply includes a ply body and a pair of turned-up portions, the ply body extends between the pair of beads, the respective turned-up portions are connected to the ply body and turned up from an inner side toward an outer side in an axial direction at the respective beads, an end of each turned-up portion is located axially inward of an end of the belt, a normal line of the carcass that passes through a point of intersection of an outer surface of the tire and a first virtual line that passes through the end of the belt and extends in the axial direction is a first normal line, a normal line of the carcass that passes through a maximum width position of the tire is a second normal line, a ratio D/E of a thickness D from the carcass to the outer surface of the tire along the first normal line to a thickness E from the carcass to the outer surface of the tire along the second normal line is not less than 1 and not greater than 2, $$LIx \leq LI \leq LIx + 4, \qquad \text{formula (1)}$$

$$LI = LIh, \qquad \text{formula (2)}$$

LIx in formula (1) and LIh in formula (2) are as follows,
LIx: load index of an EXTRA LOAD CAPACITY type tire specified in the ETRTO STANDARD MANUAL 2019, having the same dimensional structural characteristics as dimensional structural characteristics included in the tire designation of the tire, and LIh: load index of a HIGH LOAD CAPACITY type tire specified in the ETRTO STANDARD MANUAL 2021, having the same dimensional structural characteristics as the dimensional structural characteristics included in the tire designation of the tire.

The tire according to one to one or more embodiments of the present disclosure can achieve improvement of durability without an increase in rolling resistance. The mechanism by which this effect is achieved may be regarded as follows.

The thickness of a portion on the outer side of the carcass that is represented as the distance from the carcass to the outer surface of the tire along a normal line of the carcass can influence rolling resistance and durability.

A portion where the first normal line intersects the outer surface of the tire, that is, a portion on the outer side of the carcass at a buttress, can influence rolling resistance. If the thickness D of the portion on the outer side of the carcass along the first normal line is relatively thick, rolling resistance is typically increased.

A portion where the second normal line intersects the outer surface of the tire, that is, a portion on the outer side of the carcass at a portion at which the tire has the maximum width, can influence durability. If the thickness E of the portion on the outer side of the carcass along the second normal line is relatively thin, durability can be decreased, for instance, when a relatively high load is applied.

In the tire, the ratio D/E of the thickness D of the portion on the outer side of the carcass along the first normal line to the thickness E of the portion on the outer side of the carcass along the second normal line can be not less than 1 and not greater than 2, for instance. The tire according to one or more embodiments of the present disclosure can suppress the influence, of the portion on the outer side of the carcass at the buttress, on rolling resistance, and can suppress the influence of, the portion on the outer side of the carcass at the maximum width position, on durability.

The tire according to one or more embodiments of the present disclosure can achieve improvement of durability without an increase in rolling resistance.

When a high load is expected to be applied to a tire, increasing the recommended air pressure may be considered. In this case, the tire may be reinforced to increase the stiffness of the tire. However, such reinforcement can lead to an increase in mass. From the viewpoint of reducing rolling resistance, the tire may be desired or required to withstand the action of high loads without increasing the recommended air pressure. Therefore, the present inventors have looked at the carcass, which can be regarded as forming the framework of the tire, and have examined the ratio of the thickness of the carcass to the thickness of the tire. As a result, the present inventors have found that if the ratio of the thickness of the carcass to the thickness of the tire is excessively low, the tire cannot withstand the action of high loads, and on the other hand, if the ratio of the thickness of the carcass to the thickness of the tire is excessively high, the rubber becomes insufficient and wear resistance may be reduced. Based on this finding, in the tire, a ratio TCa/TA of a thickness TCa of the carcass at an equator plane of the tire to a thickness TA of the tire at the equator plane of the tire can be not less than 0.03 and not greater than 0.1, a ratio TCh/T1 of a thickness TCh of the carcass along the first normal line to a thickness T1 of the tire along the first normal line can be not less than 0.05 and not greater than 0.35, and/or a ratio TCe/T2 of a thickness TCe of the carcass along the second normal line to a thickness T2 of the tire along the second normal line can be not less than 0.06 and not greater than 0.55, as example ranges. In this case, the ratio of the thickness of the carcass to the thickness of the tire at each tire portion may be adjusted. The carcass can sufficiently withstand the action of high loads and contribute to maintaining good wear resistance. The tire can improve durability.

According to one or more embodiments, a difference (TCe/T2–TCh/T1) between the ratio TCe/T2 and the ratio TCh/T1 can be not less than 0.0 and not greater than 0.5, for instance. In this case, the tire can further improve durability.

According to one or more embodiments, an outer diameter of each carcass cord can be not less than 0.6 mm and not greater than 0.8 mm, as an example range. In this case, the tire can improve durability without an increase in rolling resistance.

The present inventors have further checked the ratio of the belt width to the cross-sectional width of the tire and the thickness of the sidewall layer at each bead portion, and have found that both are correlated, and that if the belt width is within an appropriate range with respect to the cross-sectional width of the tire, stiffness required for the tire can be imparted even when the carcass is composed of one carcass ply instead of two carcass plies. Based on this finding, in the tire, according to one or more embodiments, an average thickness F of the sidewall layer in a zone where a distance in the radial direction from a bead base line is 20 mm to 30 mm can satisfy the following formula (3) represented using a constant B and a cross-sectional width SW of the tire and a width BW of the belt obtained in a reference state where the tire is fitted on a standardized rim, an internal pressure of the tire is adjusted to 290 kPa, and no load is applied to the tire, and the constant B can satisfy the following formula (4) represented using an aspect ratio RA of the tire, $$\text{formula (4)}$$
$$380 \times (BW/SW - B)^2 + 3.5 \le F \le 380 \times (BW/SW - B)^2 + 5.5,$$

and $$B = 0.84 \times (-0.49 \times RA/100 + 1.22). \qquad \text{formula (5)}$$

In a rolling tire, compressive deformation is repeated at a surface portion in a zone ZF. A carcass is likely to be influenced by the compressive deformation, so that a countermeasure may generally be taken to suppress the influence of the compressive deformation on the carcass, by thickening a sidewall layer in the zone ZF and placing the carcass away from the surface of the tire. However, with this countermeasure, it may be difficult to achieve mass reduction of the tire and there may also be a concern that the durability of the tire is decreased due to promotion of heat storage. Therefore, in the conventional tire, the thickness of the sidewall layer in the zone ZF is set in the range of 6 to 12 mm.

In contrast, in the tire according to one or more embodiments of the present disclosure, when the average thickness F of the sidewall layer in the zone ZF satisfies the above-described formula (3), the width BW of the belt and the thickness of the sidewall layer in the zone ZF can be well balanced. The average thickness F of the sidewall layer which can be commensurate with the width BW of the belt is set. In other words, this tire can optimize the average thickness F while reducing compressive strain generated in the carcass. Since the average thickness F can be set at the required thickness, the tire can achieve mass reduction.

Since compressive strain generated in the carcass can be reduced, for instance, even when a load represented by the load index represented by the above-described formula (1) or (2) is applied, the tire can sufficiently withstand the action of this load. In particular, by setting the ratio (BW/SW) of the width BW of the belt to the cross-sectional width SW of the tire to be equal to the constant B represented by the formula (4), the tire can exhibit good durability even if the average thickness F of the sidewall layer in the zone ZF is set to 3.5 to 5.5 mm.

The tire according to one or more embodiments of the present disclosure can allow the sidewall layer at each bead portion to be effectively made thinner while having the stiffness required for the tire, for instance, even if the carcass is composed of one carcass ply instead of two carcass plies.

The tire according to one or more embodiments of the present disclosure can achieve improvement of durability without an increase in rolling resistance.

As described above, the tire according to one or more embodiments of the present disclosure can achieve improvement of durability without an increase in rolling resistance. This will be described in detail below with a tire shown in FIG. 1 as an example.

Exemplary Details of Embodiments of Present

FIG. 1 shows a part of a tire 2 according to one or more embodiments of the present disclosure. The tire 2 can be a pneumatic tire for a passenger car. The load index LI of the tire 2 according to one or more embodiments of the present disclosure can satisfy a relationship indicated by the following formula (1) or formula (2).

$$LIx \le LI \le LIx + 4 \qquad \text{Formula (1)}$$

$$LI = LIh \qquad \text{Formula (2)}$$

LIx in formula (1) and LIh in formula (2) can be as follows.

LIx: load index of an EXTRA LOAD CAPACITY type tire specified in the ETRTO STANDARD MANUAL 2019, having the same dimensional structural characteristics as the dimensional structural characteristics included in the tire designation of the tire 2.

LIh: load index of a HIGH LOAD CAPACITY type tire specified in the ETRTO STANDARD MANUAL 2021, having the same dimensional structural characteristics as the dimensional structural characteristics included in the tire designation of the tire 2.

The tire 2 shown in FIG. 1 can be a HIGH LOAD CAPACITY type tire, for instance, as specified in the ETRTO STANDARD MANUAL 2021. The load index LI of the tire 2 according to one or more embodiments of the present disclosure can satisfy the relationship indicated by the above formula (2).

FIG. 1 shows a part of a cross-section, of the tire 2 according to one or more embodiments of the present disclosure can, along a plane including the rotation axis of the tire 2. The cross-section shown in FIG. 1 may also be referred to as meridian cross-section. The tire 2 shown in FIG. 1 can be representative of a new tire with no running history.

A direction indicated by a double-headed arrow AD can indicate the axial direction of the tire 2. The axial direction of the tire 2 can mean a direction parallel to the rotation axis of the tire 2. A direction indicated by a double-headed arrow RD can indicate the radial direction of the tire 2. A direction perpendicular to the surface of the drawing sheet of FIG. 1 can indicate the circumferential direction of the tire 2.

An alternate long and short dash line EL extending in the radial direction can represent the equator plane of the tire 2.

A direction approaching the equator plane EL in the axial direction can correspond to the axially inner side of the tire 2, and a direction away from the equator plane EL can correspond to the axially outer side of the tire 2.

A direction indicated by an arrow RD1 can correspond to the radially outer side of the tire 2, and a direction indicated by an arrow RD2 can correspond to the radially inner side of the tire 2.

FIG. 1 shows the tire 2 fitted on a rim R according to one or more embodiments of the present disclosure. The space between the tire 2 and the rim R can be filled with air, for example, to adjust the air pressure inside the tire 2 (i.e., the internal pressure of the tire 2). The rim R can be a standardized rim. Specifically, the rim R can be regarded as a "standard rim," for instance, in the JATMA standard. The state of the tire 2 shown in FIG. 1 can be representative of the above-described reference state.

In FIG. 1, a solid line BBL extending in the axial direction can represent a bead base line. This bead base line BBL can be regarded as a line that defines the rim diameter (see, e.g., JATMA or the like) of the rim R.

In FIG. 1, a position indicated by reference character Eq can indicate the point of intersection of an outer surface 2G of the tire 2 (specifically, a tread surface described later) and the equator plane EL. The point of intersection Eq can be the equator of the tire 2.

In the case where a groove is located on the equator plane EL, the equator Eq can be specified on the basis of a virtual outer surface obtained on the assumption that no groove is provided thereon. The equator Eq can be the radially outer end of the tire 2. The equator Eq of the tire 2 can be specified in the tire 2 in the reference state.

In FIG. 1, a length indicated by a double-headed arrow SH, that is, the distance in the radial direction from the bead base line BBL to the equator Eq of the tire 2, can be the cross-sectional height of the tire 2.

According to one or more embodiments of the present disclosure, the cross-sectional height SH of the tire 2 can be represented as the product of a nominal cross-sectional width and a nominal aspect ratio. For example, in the case where the tire size of the tire 2 is 245/45R18, the tire 2 can have a nominal cross-sectional width of 245 mm and a nominal aspect ratio of 45%. In this case, the cross-sectional height SH of the tire 2 can be 110.25 mm.

In FIG. 1, a position indicated by reference character PW can indicate an axially outer end (hereinafter referred to as outer end PW) of the tire 2. In the case where decorations such as patterns and letters are present on the outer surface 2G, the outer end PW can be specified on the basis of a virtual outer surface obtained on the assumption that the decorations are not present thereon.

In FIG. 1, a length indicated by a double-headed arrow SW can indicate the cross-sectional width of the tire 2. The cross-sectional width SW can be represented as the distance in the axial direction from a first outer end PW to a second outer end PW. The cross-sectional width SW may also be the maximum width of the tire 2. The outer end PW can be a position where the maximum width SW is indicated, and can also be referred to as maximum width position PW. The cross-sectional width SW of the tire 2 can be specified in the tire 2 in the reference state.

The tire 2 can include a tread 4, a pair of sidewall layers 6, a pair of beads 8, a carcass 10, a belt 12, a band 14, a pair of chafers 16, and an inner liner 18.

The tread 4 can be located radially outward of the carcass 10. The tread 4 can be formed from a crosslinked rubber. The tread 4 can come into contact with a road surface at a tread surface 22 thereof. The tread 4 can have the tread surface 22. The outer surface 2G of the tire 2 can include the tread surface 22.

On the tread 4, grooves 24 can be formed. Accordingly, a tread pattern can be formed.

The tread 4 can have a tread body 26 and a pair of wings 28.

Each wing 28 can be located between the tread body 26 and the sidewall layer 6. The tread body 26 and the sidewall layer 6 can be joined via the wing 28. The wing 28 can be formed from a crosslinked rubber for which adhesiveness is taken into consideration.

The tread body 26 can include a cap portion 30 and a base portion 32.

The cap portion 30 can include the tread surface 22. The cap portion 30 can come into contact with a road surface. The cap portion 30 can be formed from a crosslinked rubber for which wear resistance and grip performance are taken into consideration.

The base portion 32 can be located radially inward of the cap portion 30. The base portion 32 can be covered with the cap portion 30. The base portion 32 can be formed from a crosslinked rubber that has low heat generation properties.

Each sidewall layer 6 can be connected to the tread 4. The sidewall layer 6 can be located radially inward of the tread 4. The sidewall layer 6 can be located axially outward of the carcass 10. The sidewall layer 6 can have a sidewall body 34 and a clinch 36.

The sidewall body 34 can be connected to the tread 4. The sidewall body 34 can be formed from a crosslinked rubber for which cut resistance is taken into consideration.

The clinch 36 can be located radially inward of the sidewall body 34. The clinch 36 can come into contact with the rim R. The clinch 36 can be located axially outward of the bead 8. The clinch 36 can be formed from a crosslinked rubber for which wear resistance is taken into consideration.

Each bead 8 can be located radially inward of the sidewall layer 6. Specifically, the bead 8 can be located radially inward of the sidewall body 34, and can be located axially inward of the clinch 36.

The bead 8 can include a core 38 and an apex 40. The core 38 can extend in the circumferential direction. Optionally, the core 38 can include a steel wire. The apex 40 can be located radially outward of the core 38. The apex 40 can be formed from a crosslinked rubber that has high stiffness. The apex 40 can be tapered outward in the radial direction. A position indicated by reference character PA can be regarded as the outer end of the apex 40. The outer end PA of the apex 40 can be the outer end of the bead 8.

When one bead 8 out of the pair of beads 8 is referred to as first bead 8, the other bead 8 may be referred to as second bead 8.

The carcass 10 can be located inward of the tread 4 and the pair of sidewall layers 6. The carcass 10 can extend on and between the pair of beads 8. The carcass 10 can extend on and between the first bead 8 and the second bead 8.

The carcass 10 can be composed of one carcass ply 42. The carcass 10 of the tire 2 can be lighter than a carcass including two or more carcass plies 42.

The carcass ply 42 can be turned up from the inner side to the outer side in the axial direction at each bead 8. The carcass ply 42 can include a ply body 44 and a pair of turned-up portions 46. The ply body 44 can extend between the pair of beads 8. The respective turned-up portions 46 can be connected to the ply body 44 and turned up at the respective beads 8.

As described above, the carcass 10 of the tire 2 can be composed of one carcass ply 42. Therefore, the number of carcass plies 42 located radially inward of the bead 8 can be one.

Figure 2:
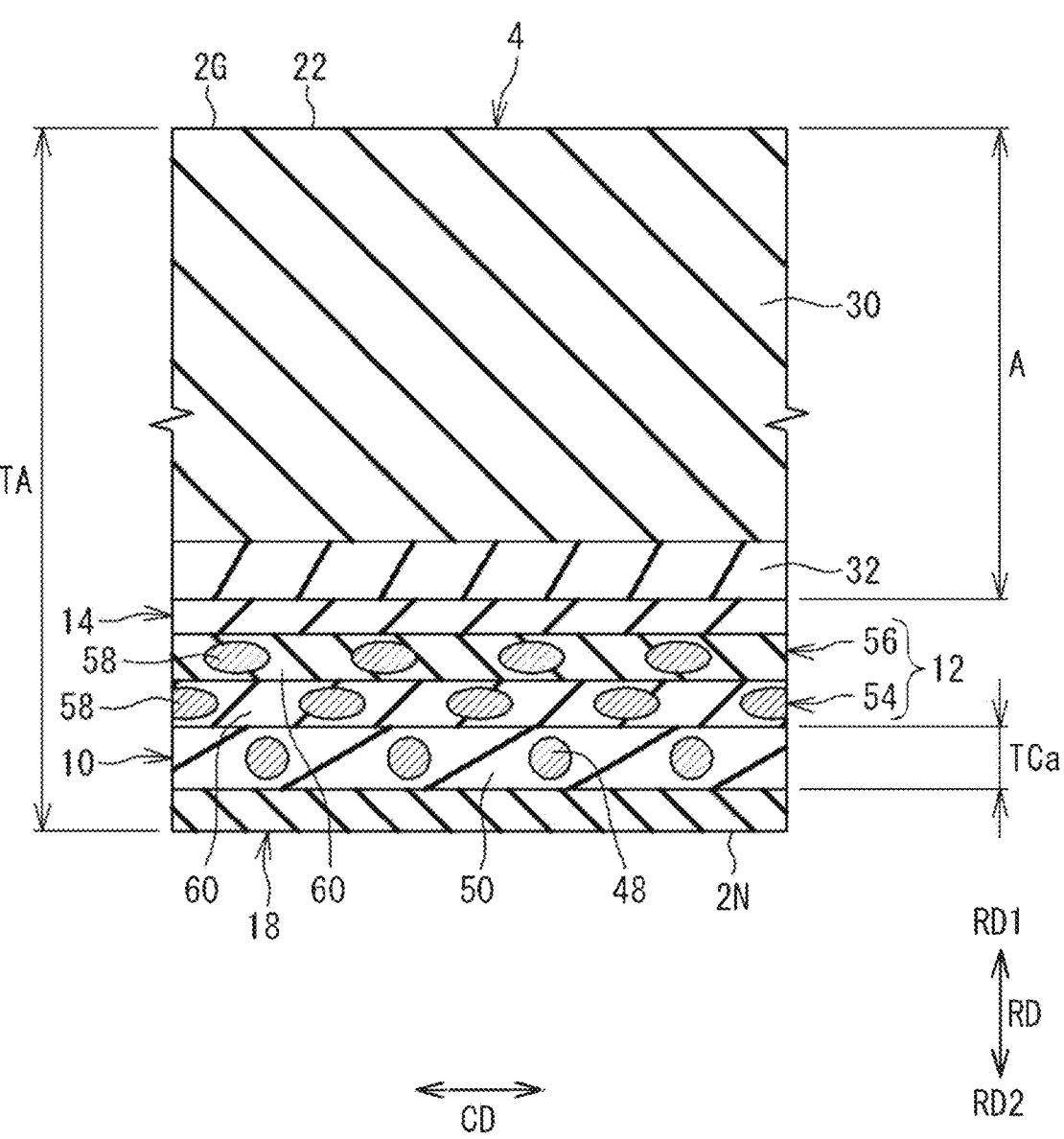
FIG. 2 is a cross-sectional view of FIG. 1 taken along an equator plane.

FIG. 2 shows a cross-section of the tire 2 along the equator plane EL. A direction indicated by an arrow CD can indicate the circumferential direction of the tire 2.

As shown in FIG. 2, the carcass ply 42 can includes a relatively large number of carcass cords 48 aligned with each other. These carcass cords 48 can be covered with a carcass topping rubber 50. The carcass cords 48 can intersect the equator plane EL. The carcass cords 48 can extend on and between the first bead 8 and the second bead 8. The carcass 10 of the tire 2 can have a radial structure.

Each carcass cord 48 of the tire 2 can be a cord formed from an organic fiber (hereinafter referred to as organic fiber cord). Examples of the organic fiber can include nylon fibers, rayon fibers, polyester fibers, and aramid fibers.

Each carcass cord 48 can be formed by twisting together a plurality of filaments formed from the organic fiber. The number of filaments constituting the carcass cord 48 can normally be two. This number may be three or may be four. The outer diameter of each filament can preferably be not less than 0.6 mm and not greater than 0.8 mm before twisting.

Figure 3:
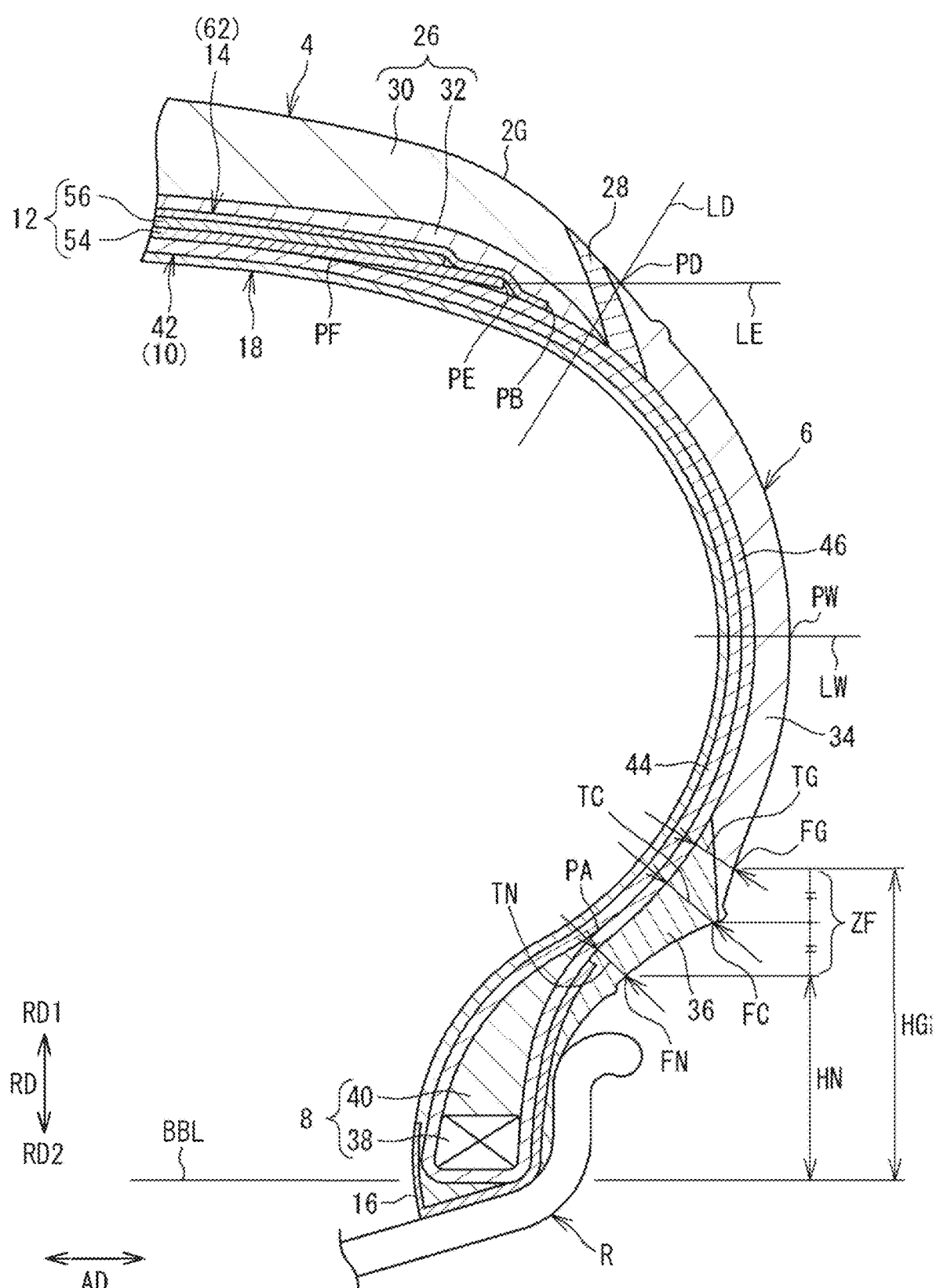
FIG. 3 is an enlarged cross-sectional view showing a part of a cross-section in FIG. 1.

FIG. 3 shows a part of the cross-section in FIG. 1. FIG. 3 shows a sidewall portion of the tire 2.

An end PF of each turned-up portion 46 of the tire 2 can be located radially outward of the maximum width position PW. A position indicated by reference character PE can indicate an end of the belt 12. The end PF of the turned-up portion 46 can be located axially inward of the end PE of the belt 12.

The end PF of the turned-up portion 46 can be interposed between the carcass 10 and the belt 12. The turned-up portion 46 can overlap a portion of the belt 12 at the end PE. The carcass 10 of the tire 2 can have an ultra-high turn-up (U-HTU) structure. As described above, the carcass 10 of the tire 2 can be composed of one carcass ply 42. The structure of the carcass 10 can be represented as "1-0U-HTU."

In the carcass 10, a portion between the end PF of one turned-up portion 46 and the end PF of the other turned-up portion 46 can be composed of a ply body 44. The outward appearance of this portion can be that of being composed of one carcass ply 42. A portion between the end PF of each turned-up portion 46 and the outer end PA of the bead 8 is composed of the ply body 44 and the turned-up portion 46. The outward appearance of this portion can be that of being composed of stacked two carcass plies 42. At a portion on the radially inner side of the outer end PA of the bead 8, the carcass ply 42 can form a loop. The number of carcass plies 42 forming the loop can be one. The bead 8 can be accommodated in the loop. The loop can surround the bead 8.

The belt 12 can be located radially inward of the tread 4. The belt 12 can be located radially outward of the carcass 10. The belt 12 of the tire 2 can be stacked on the carcass 10 on the radially inner side of the tread 4.

In FIG. 1, a length indicated by a double-headed arrow BW can indicate the width of the belt 12. The width BW of the belt 12 can be represented as the distance in the axial direction from one end PE to the other end PE of the belt 12.

In the tire 2, the ratio BW/SW of the width BW of the belt 12 to the cross-sectional width SW of the tire 2 can be not less than 0.65 and not greater than 1.00. The ratio BW/SW can be preferably not less than 0.70 and not greater than 0.95.

The belt 12 can include a plurality of belt plies 52 aligned in the radial direction. The plurality of belt plies 52 can include an inner belt ply 54 located on the innermost side and an outer belt ply 56 located on the outermost side. The belt 12 of the tire 2 can be composed of two belt plies 52. Specifically, the belt 12 can be composed of the inner belt ply 54 and the outer belt ply 56.

The inner belt ply 54 can be stacked on the carcass 10 on the radially inner side of the tread 4. The outer belt ply 56 can be stacked on the inner belt ply 54.

Each end of the outer belt ply 56 can be located axially inward of an end of the inner belt ply 54. The outer belt ply 56 can be narrower than the inner belt ply 54. The length from the end of the outer belt ply 56 to the end of the inner belt ply 54 can be not less than 3 mm and not greater than 10 mm, for instance. The above-described width BW of the belt 12 can be represented as the width of the wider inner belt ply 54. Each end of the inner belt ply 54 can be the end PE of the belt 12.

Figure 4:
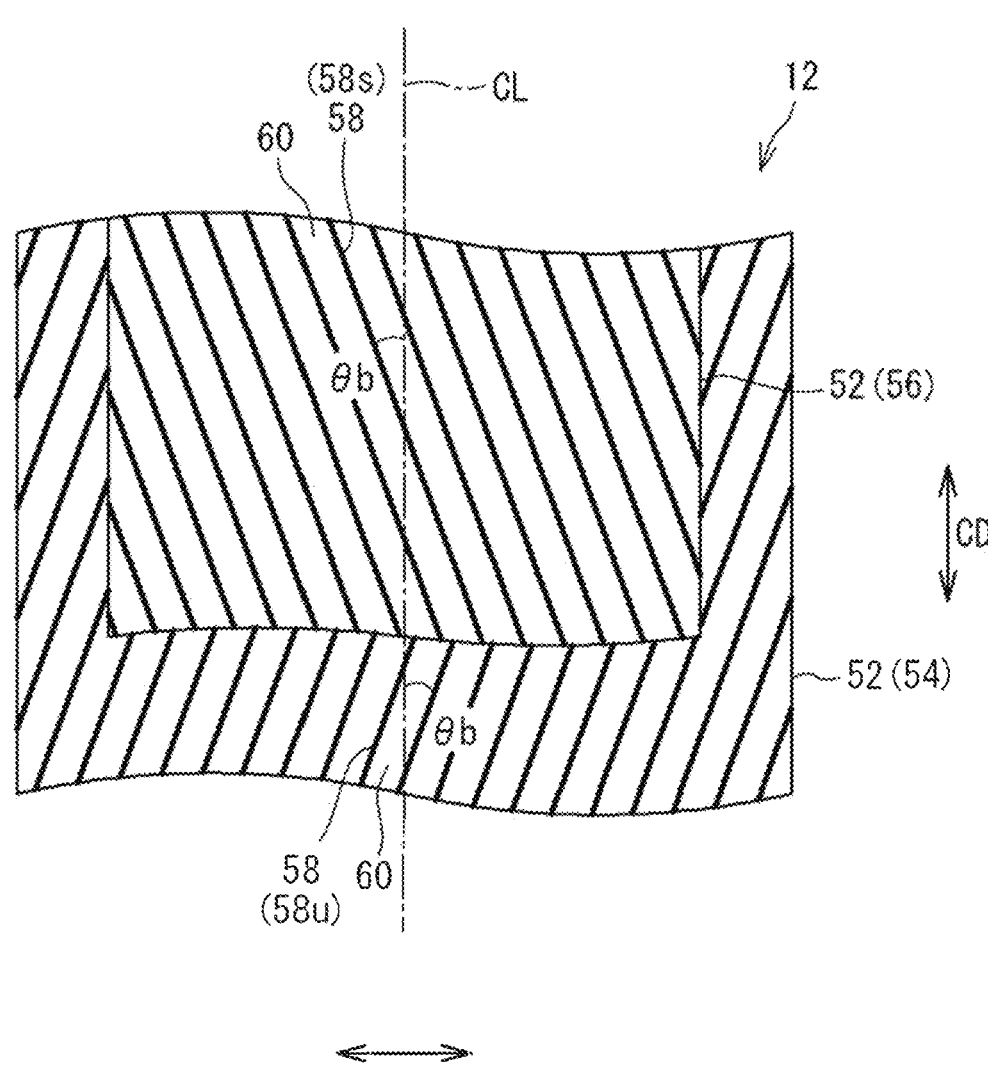
FIG. 4 is a schematic diagram illustrating the configuration of a belt.

FIG. 4 shows the configuration of the belt 12 according to one or more embodiments of the present disclosure. A direction indicated by a double-headed arrow AD can indicate the axial direction of the tire 2. A direction indicated by a double-headed arrow CD can indicate the circumferential direction of the tire 2. The front side of the drawing sheet of FIG. 4 can indicate the radially outer side, and the back side thereof can indicate the radially inner side.

Each of the plurality of belt plies 52 constituting the belt 12 can include a large number of belt cords 58 aligned with each other. The belt cords 58 can be steel cords. For convenience of description, the belt cords 58 are represented by solid lines, but the belt cords 58 may be covered with a topping rubber 60.

Each belt cord 58 can be inclined with respect to the equator plane EL. The direction of inclination of the belt cords 58 included in the outer belt ply 56 (hereinafter referred to as outer belt cords 58$s$) can be opposite to the direction of inclination of the belt cords 58 included in the inner belt ply 54 (hereinafter referred to as inner belt cords 58$u$).

An angle indicated by reference character 6$b$ can be regarded as an angle of the belt cords 58 included in the belt 12 with respect to the equator plane EL (hereinafter referred to as inclination angle of the belt cords 58).

From the viewpoint that the belt 12 can effectively contribute to inhibiting the contour of the carcass 10 from being distorted, the inclination angle θb of the belt cords 58 in the reference state can be preferably not less than 20 degrees and not greater than 32 degrees, and more preferably not less than 24 degrees and not greater than 30 degrees. Optionally, the inclination angle θb of the belt cords 58 included in the inner belt ply 54 and the inclination angle θb of the belt cords 58 included in the outer belt ply 56 can be the same.

The band 14 can be stacked on the belt 12 on the inner side of the tread 4. The band 14 can be located between the tread 4 and the belt 12 in the radial direction. A position indicated by reference character PB can indicate an end of the band 14. The end PB of the band 14 can be located axially outward of the end PE of the belt 12. The length from the end PE of the belt 12 to the end PB of the band 14 can be not less than 3 mm and not greater than 7 mm, as an example range.

The band 14 of the tire 2 can include a full band 62. The band 14 can be composed of the full band 62. The full band 62 can covers the entire belt 12 from the radially outer side.

The band 14 may further include a pair of edge bands. In this case, the pair of edge bands can be placed so as to be spaced apart from each other in the axial direction with the equator plane EL located therebetween, and each edge band can cover an end of the full band 62 from the radially outer side. The band 14 may be composed of only a pair of edge bands. In this case, the pair of edge bands can be placed so as to be spaced apart from each other in the axial direction with the equator plane EL located therebetween, and each edge band covers the end PE of the belt 12 from the radially outer side.

The full band 62 constituting the band 14 can include a helically wound band cord, according to one or more embodiments of the present disclosure. In the band 14, the band cord can extend substantially in the circumferential direction. Specifically, an angle of the band cord with respect to the circumferential direction may be not greater than 5°. The band 14 can have a jointless structure according to one or more embodiments of the present disclosure.

The band cord of the tire 2 can be an organic fiber cord. Examples of the organic fiber can include nylon fibers, rayon fibers, polyester fibers, and aramid fibers.

Each chafer 16 can be located radially inward of the bead 8. The chafer 16 can come into contact with the rim R. In the tire 2, the chafer 16 can include a fabric and a rubber with which the fabric is impregnated.

An inner end of the chafer 16 can form a part of an inner surface 2N of the tire 2. An outer end of the chafer 16 can be located radially outward of the inner end thereof. The outer end of the chafer 16 can be located between the bead 8 and the clinch 36.

The inner liner 18 can be located inward of the carcass 10. The inner liner 18 can form the inner surface 2N of the tire 2. The inner liner 18 can be formed from a crosslinked rubber that has an excellent air blocking property. The inner liner 18 can maintain the internal pressure of the tire 2.

In FIG. 3, a solid line LE can be indicated as a straight line that passes through the end PE of the belt 12 and that extends in the axial direction. According to one or more embodiments of the present disclosure, the solid line LE can be referred to as first virtual line.

A position indicated by reference character PD can indicate the point of intersection of the first virtual line LE and the outer surface 2G of the tire 2. A solid line LD can represent a normal line of the carcass 10 that passes through the point of intersection PD. According to one or more embodiments of the present, the solid line LD can be referred to as first normal line of the carcass 10. A solid line LW can represent a normal line of the carcass 10 that passes through the maximum width position PW. According to one or more embodiments of the present disclosure, the solid line LW can be referred to as second normal line of the carcass 10.

As described above, the carcass 10 can composed of one carcass ply 42, and the carcass ply 42 can includes carcass cords 48. That is, the carcass 10 can consist of the one carcass ply 42, i.e., only one carcass ply 42. Since the carcass 10 can have a radial structure, the carcass cords 48 can extend on and between one end and the other end of the carcass ply 42. The shape of the carcass ply 42 in the meridian cross-section can be represented by a center line of the carcass cord 48. The shape of the carcass ply 42 represented by the center line of the carcass cord 48 may also be referred to as carcass line. According to one or more embodiments of the present disclosure, a normal line of the carcass 10 is represented as a normal line of the carcass line. When two carcass lines overlap as in a portion where the turned-up portion 46 is stacked on the ply body 44, the normal line of the carcass 10 can be specified on the basis of the carcass line on the outer surface side of the tire 2.

Figure 5:
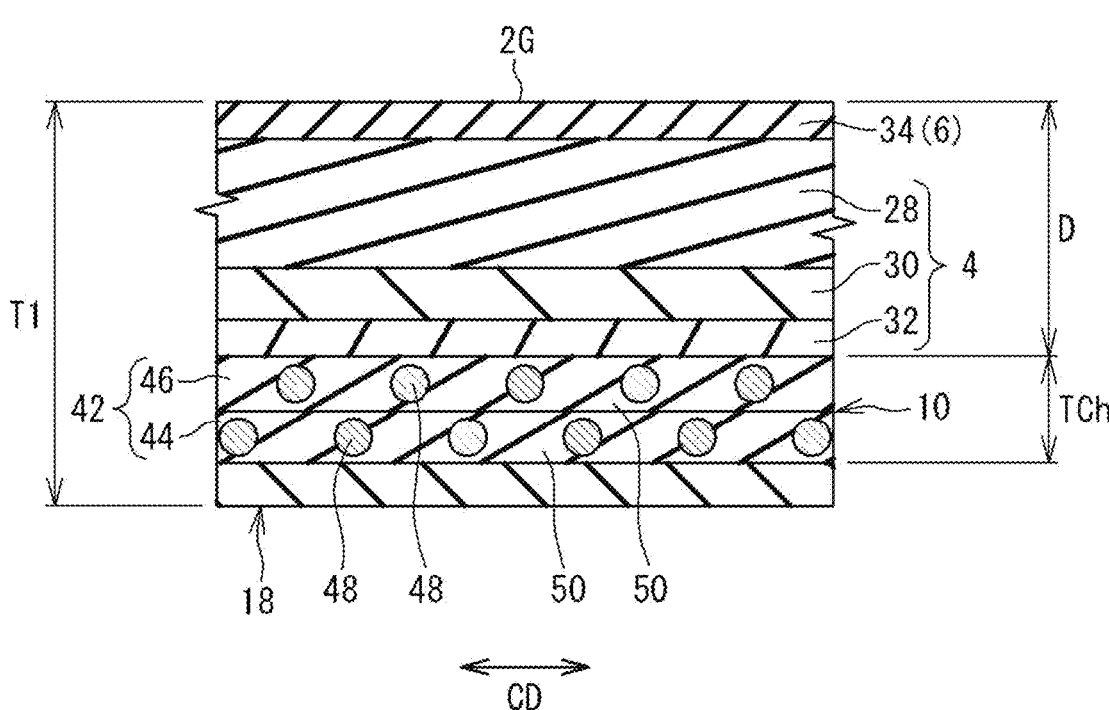
FIG. 5 is a cross-sectional view of FIG. 3 taken along a line LD.

FIG. 5 shows a part of a cross-section of the tire 2 along the first normal line LD of the carcass 10 shown in FIG. 3. The up-down direction coincides with the direction of the first normal line LD.

A length indicated by a double-headed arrow D can indicate the thickness from the carcass 10 to the outer surface 2G of the tire 2 along the first normal line LD, that is, the thickness of a rubber component located outward of the carcass 10. The thickness D may also be referred to as thickness of a portion on the outer side of the carcass 10 at a buttress. The first normal line LD can cross the inner liner 18, the carcass 10, the tread 4, and the sidewall layer 6 from the inner side. The thickness D can be equal to the sum of the thickness of the tread 4 and the thickness of the sidewall layer 6 measured along the first normal line LD.

Figure 6:
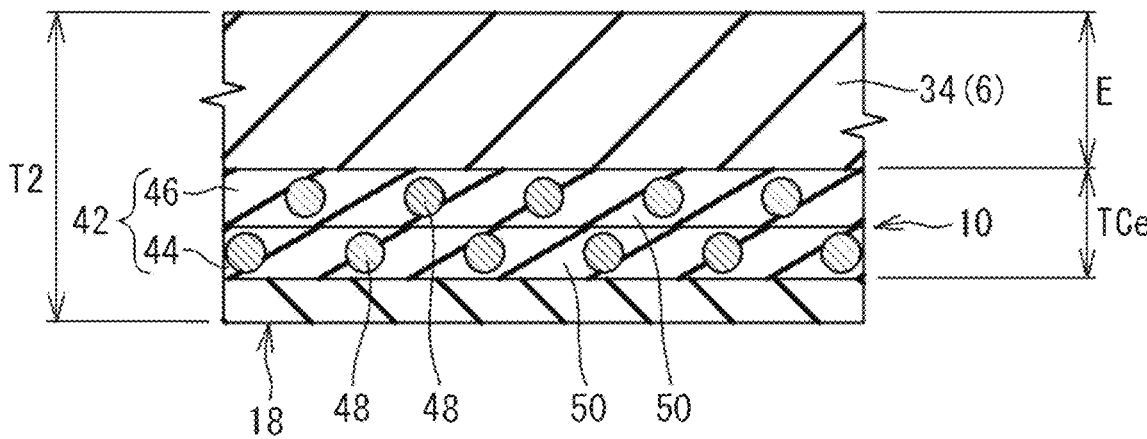
FIG. 6 is a cross-sectional view of FIG. 3 taken along a line LW.

FIG. 6 shows a part of a cross-section of the tire 2 along the second normal line LW of the carcass 10 shown in FIG. 3. The up-down direction coincides with the direction of the second normal line LW.

A length indicated by a double-headed arrow E can indicate the thickness from the carcass 10 to the outer surface 2G of the tire 2 along the second normal line LW. The thickness E may also be referred to as thickness of a portion on the outer side of the carcass 10 at the maximum width position PW. The second normal line LW can crosses the inner liner 18, the carcass 10, and the sidewall layer 6 from the inner side. The thickness E can be equal to the thickness of the sidewall layer 6 measured along the second normal line LW.

The ratio D/E of the thickness D of the portion on the outer side of the carcass 10 along the first normal line LD to the thickness E of the portion on the outer side of the carcass 10 along the second normal line LW can be not less than 1 and not greater than 2, as an example.

Since the ratio D/E can be not less than 1, the tire 2 can ensure the required stiffness, especially at the buttress. Since the ratio D/E can be not greater than 2, the tire 2 can suppress the influence of, the portion on the outer side of the carcass 10 at the buttress, on rolling resistance, and can suppress the influence of, the portion on the outer side of the carcass 10 at the maximum width position PW, on durability. From this viewpoint, the ratio D/E can be not less than 1.0 and not greater than 1.5, for instance.

The tire 2 according to one or more embodiments of the present disclosure can suppress the influence of, the portion on the outer side of the carcass 10 at the buttress, on rolling resistance while ensuring the required stiffness, and can suppress the influence of, the portion on the outer side of the carcass 10 at the maximum width position PW, on durability.

The tire 2 according to one or more embodiments of the present disclosure can achieve improvement of durability without an increase in rolling resistance.

In FIG. 2, a length indicated by a double-headed arrow A can indicate the thickness of the tread 4 at the equator plane EL. The thickness A can be represented as the thickness of the tread 4 along the equator plane EL in the meridian cross-section.

From the viewpoint that the tread 4 can ensure the required stiffness, for instance, the ratio D/A of the thickness D of the portion on the outer side of the carcass 10 at the buttress to the thickness A of the tread 4 at the equator plane EL can be not less than 0.3 and more preferably not less than 0.5, as an example range. From the viewpoint of reducing rolling resistance, for instance, the ratio D/A can be not greater than 1.2 and more preferably not greater than 0.8.

From the viewpoint of ensuring stiffness and reducing rolling resistance, for instance, the thickness A of the tread 4 at the equator plane EL can be not less than 8.0 mm and not greater than 13.0 mm, as examples.

In FIG. 2, a double-headed arrow TA can indicate the thickness of the tire 2 at the equator plane EL. The thickness TA can be represented as the thickness from the inner surface 2N to the outer surface 2G of the tire 2 along the equator plane EL in the meridian cross-section. A length indicated by a double-headed arrow TCa can indicate the thickness of the carcass 10 at the equator plane EL. The thickness TCa can be represented as the thickness of the carcass 10 along the equator plane EL in the meridian cross-section.

As described above, the portion between the end PF of one turned-up portion 46 and the end PF of the other turned-up portion 46 can be composed of only the ply body 44. The thickness TCa can correspond to the thickness of one carcass ply 42.

In FIG. 5, a double-headed arrow T1 can indicate the thickness of the tire 2 along the first normal line LD. The thickness T1 can be represented as the thickness from the inner surface 2N to the outer surface 2G of the tire 2 along the first normal line LD. A length indicated by a double-headed arrow TCh can indicate the thickness of the carcass 10 along the first normal line LD.

As described above, the portion between the end PF of each turned-up portion 46 and the outer end PA of the bead 8 can be composed of the ply body 44 and the turned-up portion 46. The thickness TCh can correspond to the thickness of two carcass plies 42.

In FIG. 6, a double-headed arrow T2 can indicate the thickness of the tire 2 along the second normal line LW. The thickness T2 can be represented as the thickness from the inner surface 2N to the outer surface 2G of the tire 2 along the second normal line LW. A length indicated by a double-headed arrow TCe can indicate the thickness of the carcass 10 along the second normal line LW.

As described above, the portion between the end PF of each turned-up portion 46 and the outer end PA of the bead 8 can be composed of the ply body 44 and the turned-up portion 46. As with the above-described thickness TCh, the thickness TCe also can correspond to the thickness of two carcass plies 42.

When a high load is expected to be applied to a tire such as described above, increasing the recommended air pressure may be considered. In this case, the tire may be reinforced to increase the stiffness of the tire. However, such reinforcement may lead to an increase in mass. From the viewpoint of reducing rolling resistance, the tire may be required to withstand the action of high loads without increasing the recommended air pressure.

Therefore, as described above, the present inventors have focused on the carcass, which can be regarded as forming the framework of the tire, and have examined the ratio of the thickness of the carcass to the thickness of the tire.

The ratio TCa/TA of the thickness TCa of the carcass 10 at the equator plane EL to the thickness TA of the tire 2 at the equator plane EL can be not less than 0.03 and not greater than 0.1, according to one or more embodiments of the present disclosure.

When the ratio TCa/TA is set to be not less than 0.03, the carcass 10 at the equator plane EL can effectively reinforce the tire 2. The stiffness of the tire 2 can be increased. Even when a high load acts on the tire 2, the tire 2 can withstand the action of the high load. The amount of rubber can be appropriately maintained, for instance, so that an increase in rolling resistance is suppressed. From this viewpoint, for instance, the ratio TCa/TA can be not less than 0.05.

When the ratio TCa/TA is set to be not greater than 0.1, the tire 2 can sufficiently ensure the amount of rubber in the portion on the outer side of the carcass 10. The tire 2 can maintain good wear resistance. From this viewpoint, for instance, the ratio TCa/TA can be not greater than 0.08.

The ratio TCh/T1 of the thickness TCh of the carcass 10 along the first normal line LD to the thickness T1 of the tire 2 along the first normal line LD can be not less than 0.05 and not greater than 0.35, as an example range.

When the ratio TCh/T1 is set to be not less than 0.05, the carcass 10 can effectively reinforce the tire 2 at the buttress. The stiffness of the tire 2 can be increased. Even when a high load acts on the tire 2, the tire 2 can withstand the action of the high load. The amount of rubber can be appropriately maintained, for instance, so that an increase in rolling resistance can be suppressed. From this viewpoint, for instance, the ratio TCh/T1 can be not less than 0.15 and further preferably not less than 0.20.

When the ratio TCh/T1 is set to be not greater than 0.35, the tire 2 can sufficiently ensure the amount of rubber in the portion on the outer side of the carcass 10. The tire 2 can maintain good wear resistance. The portion on the outer side of the carcass 10 can be deformed so as to follow the deformation of the tire 2. The tire 2 can maintain good durability. From this viewpoint, for instance, the ratio TCh/T1 can be not greater than 0.30 and further preferably not greater than 0.25.

The ratio TCe/T2 of the thickness TCe of the carcass 10 along the second normal line LW to the thickness T2 of the tire 2 along the second normal line LW can be not less than 0.06 and not greater than 0.55, as an example range.

When the ratio TCe/T2 is set to be not less than 0.06, the carcass 10 can effectively reinforce the tire 2 at the maximum width position PW. The stiffness of the tire 2 can be increased. Even when a high load acts on the tire 2, the tire 2 can withstand the action of the high load. The amount of rubber can be appropriately maintained, for instance, so that an increase in rolling resistance can be suppressed. From this viewpoint, for instance, the ratio TCe/T2 can be not less than 0.15 and further preferably not less than 0.20.

When the ratio TCe/T2 is set to be not greater than 0.55, the tire 2 can sufficiently ensure the amount of rubber in the portion on the outer side of the carcass 10. The portion on the outer side of the carcass 10 can be deformed so as to follow the deformation of the tire 2. The tire 2 can maintain good durability. From this viewpoint, for instance, the ratio TCe/T2 can be not greater than 0.40 and further preferably not greater than 0.30.

From the viewpoint that the carcass 10 can effectively contribute to the tire 2 withstanding the action of high loads, for instance, it can be that the ratio TCa/TA of the thickness TCa of the carcass 10 at the equator plane EL to the thickness TA of the tire 2 at the equator plane EL is not less than 0.03 and not greater than 0.1, the ratio TCh/T1 of the thickness TCh of the carcass 10 along the first normal line LD to the thickness T1 of the tire 2 along the first normal line LD is not less than 0.05 and not greater than 0.35, and the ratio TCe/T2 of the thickness TCe of the carcass 10 along the second normal line LW to the thickness T2 of the tire 2 along the second normal line LW is not less than 0.06 and not greater than 0.55. In this case, for instance, the tire 2 can effectively withstand the action of high loads without increasing the recommended air pressure. The tire 2 can improve durability without an increase in rolling resistance. From this viewpoint, for instance, the difference between the ratio TCe/T2 and the ratio TCh/T1 can be not less than 0.0 and not greater than 0.5, and more preferably not less than 0.00 and not greater than 0.10, as example ranges.

In FIG. 3, a position indicated by reference character FN can indicate a position on the outer surface 2G of the tire 2. A distance HN in the radial direction from the bead base line BBL to the position FN can be 20 mm, as an example.

A position indicated by reference character FG can indicate a position on the outer surface 2G of the tire 2. A distance HG in the radial direction from the bead base line BBL to the position FG can be 30 mm, as an example.

FIG. 3 represents a zone from the position FN to the position FG as a zone ZF according to one or more embodiments of the present disclosure. The zone ZF is a zone where the distance in the radial direction from the bead base line BBL can be 20 mm to 30 mm, according to one or more embodiments of the present disclosure.

The position FN can indicate an inner end of the zone ZF, and the position FG can indicate an outer end of the zone ZF.

A position indicated by reference character FC can indicate the point of intersection of a radial center line of the zone ZF and the outer surface 2G of the tire 2. The position FC can be or indicate the center of the zone ZF.

Strain can be generated in the tire 2 due to the action of a load. In particular, large compressive strain may be generated in the vicinity of the zone ZF. To prevent damage to the bead portion, for instance, the sidewall layer 6 may be formed so as to be thicker in the vicinity of the zone ZF than in the other portion.

In FIG. 3, a length indicated by a double-headed arrow TN can indicate the thickness of the sidewall layer 6 at the inner end FN of the zone ZF. A length indicated by a double-headed arrow TG can indicate the thickness of the sidewall layer 6 at the outer end FG of the zone ZF. A length indicated by a double-headed arrow TC can correspond to the thickness of the sidewall layer 6 at the center FC of the zone ZF. Each of the thickness TN, the thickness TG, and the thickness TC can be measured along a normal line of the carcass 10.

According to one or more embodiments of the present disclosure, an average thickness F of the sidewall layer 6 in the zone ZF can be represented as the average value of the thickness TN, the thickness TG, and the thickness TC.

Focusing on the fact that the width BW of the belt can influence the contour of the carcass (specifically, the ply body) and that strain generated in each bead portion can increase and the durability of the tire can decrease if the contour of the carcass is distorted, the present inventors have conducted an intensive study on how much average thickness F of the sidewall layer in the zone ZF described above is enough to allow the tire to withstand the action of high loads as shown in the above-described formula (1) or (2), while adjusting the width BW of the belt. As a result, a relational expression shown below has been obtained for the average thickness F of the sidewall layer 6 in the zone ZF.

That is, the average thickness F of the sidewall layer 6 in the zone ZF, according to one or more embodiments, can satisfy the following formula (3) represented using a constant B and the cross-sectional width SW of the tire 2 and the width BW of the belt 12 obtained in the reference state of the tire 2.

$$380 \times (BW/SW - B)^2 + 3.5 \le F \le 380 \times (BW/SW - B)^2 + 5.5 \qquad \text{Formula (3)}$$

The units of the average thickness F, the cross-sectional width SW, and the width BW can be mm (millimeters).

Furthermore, the constant B can satisfy the following formula (4) represented using an aspect ratio RA of the tire 2.

$$B = 0.84 \times (-0.49 \times RA/100 + 1.22) \qquad \text{Formula (4)}$$

The "nominal aspect ratio" may be used as the aspect ratio RA in the formula (4). For example, in the case where the tire size of a tire is 245/45R18, this tire can have a nominal aspect ratio RA of 45%. In this case, the constant B can be 0.84.

If the average thickness F is less than $380 \times (BW/SW - B)^2 + 3.5$, the sidewall layer 6 in the zone ZF may be regarded as becoming excessively thin, and there may be a concern that the tire cannot withstand the action of high loads.

If the average thickness F is greater than $380 \times (BW/SW - B)^2 + 5.5$, the sidewall layer 6 in the zone ZF may become excessively thick, and there may be a concern that the significance of adopting the carcass 10, which can be composed of one carcass ply 42, to reduce mass may be lost.

However, when the average thickness F satisfies the above-described formula (3), the width BW of the belt 12 and the thickness of the sidewall layer 6 in the zone ZF may be regarded as being well balanced. The average thickness F of the sidewall layer 6 which is commensurate with the width BW of the belt 12 can be set. In other words, the tire 2 according to one or more embodiments of the present disclosure can optimize the average thickness F while reducing compressive strain generated in the carcass 10. Since the average thickness F can be set at the required thickness, the tire 2 can achieve mass reduction. Since compressive strain generated in the carcass 10 can be reduced, the tire 2 can withstand the action of high loads. In particular, by setting the ratio (BW/SW) of the width BW of the belt 12 to the cross-sectional width SW of the tire 2 to be equal to the constant B represented by the formula (2), the tire 2 according to one or more embodiments of the present disclosure can withstand the action of high loads, such as shown in the above-described formula (1) or (2), even if the average thickness F of the sidewall layer 6 in the zone ZF is set to 3.5 to 5.5 mm, for instance.

Even though the carcass 10 which can be composed of one carcass ply 42 can be adopted, the tire 2 according to one or more embodiments of the present disclosure can allow the sidewall layer 6 at the bead portion to be effectively made thinner while ensuring the stiffness required to withstand the action of high loads.

The tire 2 according to one or more embodiments of the present disclosure can achieve improvement of durability, for instance, without an increase in rolling resistance. From this viewpoint, for instance, is can be that the average thickness F of the sidewall layer 6 in the zone ZF satisfies the above-described formula (3) and/or the constant B satisfies the above-described formula (4).

According to aspects, the tire 2 that can achieve improvement of durability without an increase in rolling resistance, can be obtained according to one or more embodiments of the present disclosure.

EXAMPLES

Hereinafter, the present disclosure is not limited to the below examples.

Examples 1 and 2 and Comparative Examples 1 to 3

Tires (tire size=245/45R18) of Examples 1 and 2 and Comparative Examples 1 to 3 having the basic structure shown in FIG. 1 and having specifications shown in Table 1 below were obtained.

In Table 1, each cell denoted by "Cb" represents the number of carcass plies located radially inward of the bead. The carcasses of Examples 1 and 2 and Comparative Example 1 each have a 1-0U-HTU structure, and thus the number Cb of carcass plies located radially inward of the bead is one.

The ratio BW/SW of the belt width BW to the tire cross-sectional width SW was 0.95.

In Comparative Example 2, a carcass having a 1-0HTU structure was adopted. In Comparative Example 2, the carcass was composed of one carcass ply, and the end of the turned-up portion was placed at a position away from the maximum width position outward in the radial direction by 5 mm. The end of the turned-up portion does not overlap the end of the belt. The number Cb of carcass plies located radially inward of the bead is one.

In Comparative Example 3, a carcass having a 2-0HTU structure was adopted. In Comparative Example 3, the carcass was composed of two carcass plies, the end of the turned-up portion located on the axially inner side was placed at a position away from the maximum width position outward in the radial direction by 30 mm, and the end of the turned-up portion located on the axially outer side was placed at a position away from the maximum width position outward in the radial direction by 5 mm. None of the ends of the two turned-up portions overlaps the end of the belt. The number Cb of carcass plies located radially inward of the bead is two.

Rolling Resistance (RRC)

Using a rolling resistance testing machine, a rolling resistance coefficient (RRC) was measured when a test tire ran on a drum at a speed of 80 km/h under the following conditions. The results are shown in the cells for "RRC" in Table 1 below as indexes with the result of Example 1 being set at 10 points. The higher the value is, the lower the rolling resistance of the tire is.

Rim: 8.0 inches
Internal pressure: 250 kPa
Vertical load: 6.86 kN

Durability

A test tire was fitted onto a rim (size=8.0 inches) and inflated with air to adjust the internal pressure thereof to 360 kPa. The tire was mounted to a drum type tire testing machine. A vertical load of 8.58 kN was applied to the tire, and the tire was caused to run on a drum (radius=1.7 m) at a speed of 100 km/h. The running distance was measured until damage to the tire was observed. The results are shown in the cells for "Durability" in Table 1 below as indexes with the result of Example 1 being set at 10 points. The higher the value is, the better the durability is.

TABLE 1

|  | Example 1 | Example 2 | Comparative Example 1 | Comparative Example 2 | Comparative Example 3 |
|---|---|---|---|---|---|
| Carcass structure | 1-0 UHTU | 1-0 UHTU | 1-0 UHTU | 1-0 HTU | 2-0 HTU |
| D/E[—] | 1.0 | 2.0 | 3.0 | 1.5 | 1.5 |
| TCa/TA[—] | 0.05 | 0.05 | 0.05 | 0.05 | 0.15 |
| TCh/T1[—] | 0.23 | 0.15 | 0.18 | 0.10 | 0.18 |
| TCe/T2[—] | 0.23 | 0.23 | 0.31 | 0.13 | 0.31 |
| TCe/T2 − TCh/T1[—] | 0.00 | 0.08 | 0.13 | 0.03 | 0.13 |
| Cb [piece] | 1 | 1 | 1 | 1 | 2 |
| F [mm] | 9.0 | 9.0 | 4.0 | 9.0 | 9.0 |
| RRC | 10 | 9 | 9 | 10 | 7 |
| Durability | 10 | 10 | 5 | 7 | 10 |

As shown in Table 1, in each Example, improvement of durability is achieved without an increase in rolling resistance.

The above-described technology capable of achieving improvement of durability without an increase in rolling resistance can be applied to various tires.

Additional Note

One or more embodiments of the present disclosure can include aspects described below.

[1] A tire having a load index LI satisfying a relationship indicated by the following formula (1) or formula (2), the tire including:

a pair of beads;

a carcass extending on and between the pair of beads;

a pair of sidewall layers located axially outward of the carcass;

a tread located radially outward of the carcass and configured to come into contact with a road surface;

a belt including a large number of belt cords aligned with each other; and a band including a helically wound band cord, wherein the belt is stacked on the carcass on a radially inner side of the tread, the band is located between the tread and the belt in a radial direction, the carcass is composed of one carcass ply including a large number of carcass cords aligned with each other, the carcass ply includes a ply body and a pair of turned-up portions, the ply body extends between the pair of beads, the respective turned-up portions are connected to the ply body and turned up from an inner side toward an outer side in an axial direction at the respective beads, an end of each turned-up portion is located axially inward of an end of the belt, a normal line of the carcass that passes through a point of intersection of an outer surface of the tire and a first virtual line that passes through the end of the belt and extends in the axial direction is a first normal line, a normal line of the carcass that passes through a maximum width position of the tire is a second normal line,

20 a ratio D/E of a thickness D from the carcass to the outer surface of the tire along the first normal line to a thickness E from the carcass to the outer surface of the tire along the second normal line is not less than 1 and not greater than 2, $$LIx \le LI \le LIx + 4, \qquad \text{formula (1)}$$

$$LI = LIh, \qquad \text{formula (2)}$$

LIx in formula (1) and LIh in formula (2) are as follows,

LIx: load index of an EXTRA LOAD CAPACITY type tire specified in the ETRTO STANDARD MANUAL 2019, having the same dimensional structural characteristics as dimensional structural characteristics included in the tire designation of the tire, and LIh: load index of a HIGH LOAD CAPACITY type tire specified in the ETRTO STANDARD MANUAL 2021, having the same dimensional structural characteristics as the dimensional structural characteristics included in the tire designation of the tire.

[2] The tire according to [1] above, wherein a ratio TCa/TA of a thickness TCa of the carcass at an equator plane of the tire to a thickness TA of the tire at the equator plane of the tire is not less than 0.03 and not greater than 0.1, a ratio TCh/T1 of a thickness TCh of the carcass along the first normal line to a thickness T1 of the tire along the first normal line is not less than 0.05 and not greater than 0.35, and a ratio TCe/T2 of a thickness TCe of the carcass along the second normal line to a thickness T2 of the tire along the second normal line is not less than 0.06 and not greater than 0.55.

[3] The tire according to [1] or [2] above, wherein a difference (TCe/T2−TCh/T1) between the ratio TCe/T2 and the ratio TCh/T1 is not less than 0.0 and not greater than 0.5.

[4] The tire according to any one of [1] to [3] above, wherein an outer diameter of each carcass cord is not less than 0.6 mm and not greater than 0.8 mm.

[5] The tire according to any one of [1] to [4] above, wherein an average thickness F of the sidewall layer in a zone where a distance in the radial direction from a bead base line is 20 mm to 30 mm satisfies the following formula (3) represented using a constant B and a cross-sectional width SW of the tire and a width BW of the belt obtained in a reference state where the tire is fitted on a standardized rim, an internal pressure of the tire is adjusted to 290 kPa, and no load is applied to the tire, and the constant B satisfies the following formula (4) represented using an aspect ratio RA of the tire, $$\text{formula (3)}$$

$$380 \times (BW/SW - B)^2 + 3.5 \le F \le 380 \times (BW/SW - B)^2 + 5.5,$$

and $$B = 0.84 \times (-0.49 \times RA/100 + 1.22). \qquad \text{formula (4)}$$

[6] The tire according to any one of [1] to [5], wherein the tire having the load index LI satisfies the relationship indicated by the formula (1) and the formula (2).

[7] The tire according to any one of [1] to [6], wherein said one carcass ply is the only carcass ply of the carcass.

[8] The tire according to any one of [1] to [7], wherein an average thickness of each of the sidewall layers is 3.5 to 5.5 mm.

[9] The tire according to any one of [1] to [8], further comprising a pair of wings respectively between a tread body of the tread and each of the sidewall layers.

[10] The tire according to any one of [1] to [9], wherein the carcass has an ultra-high turn-up (U-HTU) structure.

[11] The tire according to any one of [1] to [10], wherein a ratio TCa/TA of a thickness TCa of the carcass at an equator plane of the tire to a thickness TA of the tire at the equator plane of the tire is not less than 0.03 and not greater than 0.1, a ratio TCh/T1 of a thickness TCh of the carcass along the first normal line to a thickness T1 of the tire along the first normal line is not less than 0.05 and not greater than 0.35, a ratio TCe/T2 of a thickness TCe of the carcass along the second normal line to a thickness T2 of the tire along the second normal line is not less than 0.06 and not greater than 0.55, an outer diameter of each carcass cord is not less than 0.6 mm and not greater than 0.8 mm, an average thickness F of the sidewall layer in a zone where a distance in the radial direction from a bead base line is 20 mm to 30 mm satisfies the following formula (3) represented using a constant B and a cross-sectional width SW of the tire and a width BW of the belt obtained in a reference state where the tire is fitted on a standardized rim, an internal pressure of the tire is adjusted to 290 kPa, and no load is applied to the tire, and the constant B satisfies the following formula (4) represented using an aspect ratio RA of the tire, $$380 \times (BW/SW - B)^2 + 3.5 \le F \le 380 \times (BW/SW - B)^2 + 5.5, \qquad \text{formula (3)}$$

and $$B = 0.84 \times (-0.49 \times RA/100 + 1.22). \qquad \text{formula (4)}$$

[12] A tire having a load index LI satisfying a relationship indicated by the following formula (1) or formula (2), the tire comprising:

a pair of beads;

a carcass extending on and between the pair of beads;

a pair of sidewall layers located axially outward of the carcass;

a tread located radially outward of the carcass and configured to come into contact with a road surface;

a belt including a large number of belt cords aligned with each other; and a band including a helically wound band cord, wherein the belt is stacked on the carcass on a radially inner side of the tread, the band is located between the tread and the belt in a radial direction, the carcass is composed of only one carcass ply that includes a plurality of carcass cords aligned with each other, the carcass ply includes a ply body and a pair of turned-up portions, the ply body extends between the pair of beads, the respective turned-up portions are connected to the ply body and turned up from an inner side toward an outer side in an axial direction at the respective beads, an end of each turned-up portion is located axially inward of an end of the belt, a normal line of the carcass that passes through a point of intersection of an outer surface of the tire and a first virtual line that passes through the end of the belt and extends in the axial direction is a first normal line, a normal line of the carcass that passes through a maximum width position of the tire is a second normal line, a ratio D/E of a thickness D from the carcass to the outer surface of the tire along the first normal line to a thickness E from the carcass to the outer surface of the tire along the second normal line is not less than 1 and not greater than 2, $$LIx \le LI \le LIx + 4, \qquad \text{formula (1)}$$

$$LI = LIh, \qquad \text{formula (2)}$$

LIx in formula (1) and LIh in formula (2) are as follows,

LIx: load index of an EXTRA LOAD CAPACITY type tire specified in the ETRTO STANDARD MANUAL 2019, having the same dimensional structural characteristics as dimensional structural characteristics included in the tire designation of the tire, and LIh: load index of a HIGH LOAD CAPACITY type tire specified in the ETRTO STANDARD MANUAL 2021, having the same dimensional structural characteristics as the dimensional structural characteristics included in the tire designation of the tire.

[13] The tire according to [12], wherein the tire having the load index LI satisfies the relationship indicated by the formula (1) and the formula (2).

[14] The tire according to [12] or [13], wherein a ratio TCh/T1 of a thickness TCh of the carcass along the first normal line to a thickness T1 of the tire along the first normal line is not less than 0.05 and not greater than 0.35, and a ratio TCe/T2 of a thickness TCe of the carcass along the second normal line to a thickness T2 of the tire along the second normal line is not less than 0.06 and not greater than 0.55.

[15] The tire according to any one of [12] to [14], wherein a difference (TCe/T2 −TCh/T1) between the ratio TCe/T2 and the ratio TCh/T1 is not less than 0.0 and not greater than 0.5.

[16] The tire according to any one of [12] to [15], wherein an outer diameter of each carcass cord is not less than 0.6 mm and not greater than 0.8 mm.

[17] The tire according to any one of [12] to [16], wherein an average thickness F of the sidewall layer in a zone where a distance in the radial direction from a bead base line is 20 mm to 30 mm satisfies the following formula (3) represented using a constant B and a cross-sectional width SW of the tire and a width BW of the belt obtained in a reference state where the tire is fitted on a standardized rim, an internal pressure of the tire is adjusted to 290 kPa, and no load is applied to the tire, and the constant B satisfies the following formula (4) represented using an aspect ratio RA of the tire, $$380 \times \left(BW/SW - B\right)^2 + 3.5 \leq F \leq 380 \times \left(BW/SW - B\right)^2 + 5.5, \quad \text{formula (3)}$$

and $$B = 0.84 \times \left(-0.49 \times RA/100 + 1.22\right). \quad \text{formula (4)}$$

[18] The tire according to any one of [12] to [17], wherein an average thickness of each of the sidewall layers is 3.5 to 5.5 mm.

What is claimed is:

1. A tire having a load index LI satisfying a relationship indicated by the following formula (1) or formula (2), the tire comprising:

a pair of beads;

a carcass extending on and between the pair of beads;

a pair of sidewall layers located axially outward of the carcass;

a tread located radially outward of the carcass and configured to come into contact with a road surface;

a belt including a large number of belt cords aligned with each other; and a band including a helically wound band cord, wherein the belt is stacked on the carcass on a radially inner side of the tread, the band is located between the tread and the belt in a radial direction, the carcass is composed of one carcass ply including a plurality of carcass cords aligned with each other, the carcass ply includes a ply body and a pair of turned-up portions, the ply body extends between the pair of beads, the respective turned-up portions are connected to the ply body and turned up from an inner side toward an outer side in an axial direction at the respective beads, an end of each turned-up portion is located axially inward of an end of the belt, a normal line of the carcass that passes through a point of intersection of an outer surface of the tire and a first virtual line that passes through the end of the belt and extends in the axial direction is a first normal line, a normal line of the carcass that passes through a maximum width position of the tire is a second normal line, a ratio D/E of a thickness D from the carcass to the outer surface of the tire along the first normal line to a thickness E from the carcass to the outer surface of the tire along the second normal line is not less than 1 and not greater than 2, $$LIx \leq LI \leq LIx + 4, \quad \text{formula (1)}$$

$$LI = LIh, \quad \text{formula (2)}$$

LIx in formula (1) and LIh in formula (2) are as follows,

LIx: load index of an EXTRA LOAD CAPACITY type tire specified in the ETRTO STANDARD MANUAL 2019, having the same dimensional structural characteristics as dimensional structural characteristics included in the tire designation of the tire, and LIh: load index of a HIGH LOAD CAPACITY type tire specified in the ETRTO STANDARD MANUAL 2021, having the same dimensional structural characteristics as the dimensional structural characteristics included in the tire designation of the tire, a ratio TCa/TA of a thickness TCa of the carcass at an equator plane of the tire to a thickness TA of the tire at the equator plane of the tire is not less than 0.03 and not greater than 0.1, a ratio TCh/T1 of a thickness TCh of the carcass along the first normal line to a thickness T1 of the tire along the first normal line is not less than 0.05 and not greater than 0.35, and a ratio TCe/T2 of a thickness TCe of the carcass along the second normal line to a thickness T2 of the tire along the second normal line is not less than 0.06 and not greater than 0.55.

2. The tire according to claim 1, wherein a difference (TCe/T2–TCh/T1) between the ratio TCe/T2 and the ratio TCh/T1 is not less than 0.0 and not greater than 0.5.

3. The tire according to claim 1, wherein an outer diameter of each carcass cord is not less than 0.6 mm and not greater than 0.8 mm.

4. The tire according to claim 1, wherein an average thickness F of the sidewall layer in a zone where a distance in the radial direction from a bead base line is 20 mm to 30 mm satisfies the following formula (3) represented using a constant B and a cross-sectional width SW of the tire and a width BW of the belt obtained in a reference state where the tire is fitted on a standardized rim, an internal pressure of the tire is adjusted to 290 kPa, and no load is applied to the tire, and the constant B satisfies the following formula (4) represented using an aspect ratio RA of the tire, $$380 \times \left(BW/SW - B\right)^2 + 3.5 \leq F \leq 380 \times \left(BW/SW - B\right)^2 + 5.5, \quad \text{formula (3)}$$

and $$B = 0.84 \times \left(-0.49 \times RA/100 + 1.22\right). \quad \text{formula (4)}$$

5. The tire according to claim 1, wherein said one carcass ply is the only carcass ply of the carcass.

6. The tire according to claim 1, wherein an average thickness of each of the sidewall layers is 3.5 to 5.5 mm.

7. The tire according to claim 1, further comprising a pair of wings respectively between a tread body of the tread and each of the sidewall layers.

8. The tire according to claim 1, wherein the carcass has an ultra-high turn-up (U-HTU) structure.

9. The tire according to claim 1, wherein an outer diameter of each carcass cord is not less than 0.6 mm and not greater than 0.8 mm, an average thickness F of the sidewall layer in a zone where a distance in the radial direction from a bead base line is 20 mm to 30 mm satisfies the following formula (3) represented using a constant B and a cross-sectional width SW of the tire and a width BW of the belt obtained in a reference state where the tire is fitted on a standardized rim, an internal pressure of the tire is adjusted to 290 kPa, and no load is applied to the tire, and the constant B satisfies the following formula (4) represented using an aspect ratio RA of the tire, formula (3)

$$380 \times (BW/SW - B)^2 + 3.5 \le F \le 380 \times (BW/SW - B)^2 + 5.5,$$

and $$B = 0.84 \times (-0.49 \times RA/100 + 1.22).$$   formula (4)

10. A tire having a load index LI satisfying a relationship indicated by the following formula (1) or formula (2), the tire comprising:

a pair of beads;

a carcass extending on and between the pair of beads;

a pair of sidewall layers located axially outward of the carcass;

a tread located radially outward of the carcass and configured to come into contact with a road surface;

a belt including a large number of belt cords aligned with each other; and a band including a helically wound band cord, wherein the belt is stacked on the carcass on a radially inner side of the tread, the band is located between the tread and the belt in a radial direction, the carcass is composed of only one carcass ply that includes a plurality of carcass cords aligned with each other, the carcass ply includes a ply body and a pair of turned-up portions, the ply body extends between the pair of beads, the respective turned-up portions are connected to the ply body and turned up from an inner side toward an outer side in an axial direction at the respective beads, an end of each turned-up portion is located axially inward of an end of the belt, a normal line of the carcass that passes through a point of intersection of an outer surface of the tire and a first virtual line that passes through the end of the belt and extends in the axial direction is a first normal line, a normal line of the carcass that passes through a maximum width position of the tire is a second normal line, a ratio D/E of a thickness D from the carcass to the outer surface of the tire along the first normal line to a thickness E from the carcass to the outer surface of the tire along the second normal line is not less than 1 and not greater than 2, $$LIx \le LI \le LIx + 4,$$   formula (1)

$$LI = LIh,$$   formula (2)

LIx in formula (1) and LIh in formula (2) are as follows,

LIx: load index of an EXTRA LOAD CAPACITY type tire specified in the ETRTO STANDARD MANUAL 2019, having the same dimensional structural characteristics as dimensional structural characteristics included in the tire designation of the tire, and LIh: load index of a HIGH LOAD CAPACITY type tire specified in the ETRTO STANDARD MANUAL 2021, having the same dimensional structural characteristics as the dimensional structural characteristics included in the tire designation of the tire, a ratio TCh/T1 of a thickness TCh of the carcass along the first normal line to a thickness T1 of the tire along the first normal line is not less than 0.05 and not greater than 0.35, and a ratio TCe/T2 of a thickness TCe of the carcass along the second normal line to a thickness T2 of the tire along the second normal line is not less than 0.06 and not greater than 0.55.

11. The tire according to claim 10, wherein a difference (TCe/T2–TCh/T1) between the ratio TCe/T2 and the ratio TCh/T1 is not less than 0.0 and not greater than 0.5.

12. The tire according to claim 10, wherein an outer diameter of each carcass cord is not less than 0.6 mm and not greater than 0.8 mm.

13. The tire according to claim 10, wherein an average thickness F of the sidewall layer in a zone where a distance in the radial direction from a bead base line is 20 mm to 30 mm satisfies the following formula (3) represented using a constant B and a cross-sectional width SW of the tire and a width BW of the belt obtained in a reference state where the tire is fitted on a standardized rim, an internal pressure of the tire is adjusted to 290 kPa, and no load is applied to the tire, and the constant B satisfies the following formula (4) represented using an aspect ratio RA of the tire, formula (3)

$$380 \times (BW/SW - B)^2 + 3.5 \le F \le 380 \times (BW/SW - B)^2 + 5.5,$$

and $$B = 0.84 \times (-0.49 \times RA/100 + 1.22).$$   formula (4)

14. The tire according to claim 10, wherein an average thickness of each of the sidewall layers is 3.5 to 5.5 mm.

* * * * *